Patented Oct. 21, 1941

2,260,033

UNITED STATES PATENT OFFICE 2,260,033

PREPARATION OF UREA-FORMALDEHYDE RESINOUS MOLDING COMPOSITIONS

Roy H. Kienle, Bound Brook, N. J., and William J. Scheiber, Schenectady, N. Y., assignors to General Electric Company, a corporation of New York No Drawing. Application February 23, 1938, Serial No. 191,950

1 Claim. (Cl. 260—42)

This invention relates broadly to synthetic resins. Specifically, it is concerned with the preparation of compositions comprising urea-formaldehyde resins and products including the same.

Urea-formaldehyde resins differ from phenol-formaldehyde resins in that the former evolve rather than absorb formaldehyde on conversion to the infusible, insoluble state; they are colorless and light stable; and, since they possess hydrophilic tendencies, they are more difficult to formulate so that actual moisture-repellent characteristics are present.

Resins made from urea and formaldedye have heretofore been prepared in a variety of ways and under widely varying conditions and proportions. Both acid and alkaline catalysts of the condensation reaction have been used. Usually a large excess of formaldehyde, for example from 2 to 3 or more mols of formaldehyde to 1 mol of urea, has been employed to ensure complete conversion of the resin to the infusible state. This large excess of formaldehyde has been objectionable in the finished product and it has taken various means, often complicated, wholly or partly to remove it before the resin is completed.

After a series of investigations we have found that it is possible to prepare a colorless, light-stable urea-formaldehyde resin without using such proportions of formaldehyde to urea as above mentioned, thus lessening the raw material cost. Moreover, we have been able to so formulate our method that the reaction can be carried out entirely in the cold, that is at room temperature, rendering the process more economical. Furthermore, we have been able to produce a resin with a urea-formaldehyde ratio of 1 mol to 1 mol which has heretofore been very difficult to do. Because of the successful combination of these ingredients in this ratio no excess of formaldehyde is present in a finished product so made. An unexpected result is not only this combining ratio but in addition the fact that we obtain with this ratio a resin that is readily heat convertible and moldable, two important desired properties. We have found the resins made in accordance with our invention to be practically adaptable to molded compounds, laminated material and to the making of films therefrom.

In order that our invention may be fully understood and practiced by those skilled in the art to which it pertains, the following illustrative examples are given.

Example I

Six hundred and forty parts by weight of an aqueous solution of formaldehyde (37.4%), which is equivalent to 240 parts by weight of 100% formaldehyde, are warmed to 30° C. and 480 parts by weight of pure urea are slowly added, while maintaining the temperature at 30° C. To the mixture sufficient triethanolamine is added to bring the solution to a pH of 7.0. In the particular instance here described 2.0 cc. of a 50% solution of triethanolamine and distilled water was used. The reaction vessel is transferred to a water bath and the resin stirred vigorously for four hours. Hot or cold water is added to the bath, as may be required, in order to maintain the resin syrup at a temperature of 30° C.

It is to be observed that the conditions of reaction are neutral. No condensation catalyst is employed and the mol ratio of reactants is equal.

Upon completion of the above reaction the resin syrup is worked into fillers to make a molding compound which can be molded. For example, the resin syrup obtained above is saturated with fillers and pigment according to the following formula:

| | Per cent |
|---|---|
| Resin (calculated amount in 1260 parts by weight of above resin syrup), 672 parts by weight | 60 |
| TiO₂, 112 parts by weight | 10 |
| Alpha cellulose, 336 parts by weight | 30 |
| Chrome yellow, 0.56 parts by weight | 0.05 of total |
| Raw sienna, 0.56 parts by weight | 0.05 of total |

The mass is thoroughly mixed in a vertical mixer and then spread out in thin layers in a well ventilated oven and dried at 60° C. to a 5 to 7% moisture content. The compound is then ground and sieved, at which time it is ready for molding.

If desired, a conversion catalyst may be used with the molding compound. For example, 0.05% of ammonium sulphate is dissolved in the resin syrup as above prepared before the addition of the fillers and pigment. This addition is not necessary, for conversion will occur without the catalyst.

Example II

Sufficient triethanolamine is added to 2440 parts by weight of an aqueous formaldehyde solution (37% formaldehyde) so that the resulting urea-formaldehyde solution shall be at a pH of 7.0. The formaldehyde is then warmed to 30° C. and 1200 parts by weight of pure urea are slowly added. This is in a ratio of approximately 1 mol of urea to 1.5 mols of formaldehyde. While the urea is dissolving heat is applied to maintain the mass at a temperature of 30° C. The reaction vessel is transferred to a water bath and the resin is stirred vigorously for four hours. Hot or cold water is added to the bath, as may be required, in order to maintain the resin syrup at a temperature of 30° C.

Prior to compounding, the neutral resin is made slightly acid to a pH of 6.0 to further catalyze conversion and minimize the molding cycle. For this purpose it is preferred to use a weak organic acid, e. g. phthalic acid.

In the above example sufficient N/10 phthalic acid is added to bring the resin syrup to a pH of 6.0. 1% of ammonium sulphate is then dissolved therein, after which it is saturated with fillers according to the following formula:

|  | Per cent |
|---|---|
| Resin (calculated amount in 3640 parts by weight of resin syrup, 1680 parts by weight | 60 |
| Lithopone, 280 parts by weight | 10 |
| Alpha cellulose, 840 parts by weight | 30 |
| Chrome yellow, 1.4 parts by weight | 0.05 of total |
| Raw sienna, 1.4 parts by weight | 0.05 of total |

The entire mass is well mixed and dried in thin layers at 60° C. to a water content of 5 to 7%. The compound is then ground, sieved and molded.

*Example III*

A neutral resin is prepared as in the foregoing examples. The neutral resin syrup is mixed with a water-soluble resin as the conversion catalyst, for instance, an ammoniacal solution of an alkyd resin. For example, An ammoniacal alkyd resin solution is prepared by dissolving 60 parts by weight of powdered A-stage glycerol phthalate resin in 60 parts by volume NH4OH and 150 parts by volume of water. This is then blended with 516 parts by weight of the urea resin syrup prepared as outlined in Example I, the ratio being

|  | Per cent |
|---|---|
| Urea resin syrup, 516 parts by weight (resin 240 parts by weight) | 80 |
| Ammoniacal alkyd resin, 60 parts by weight | 20 |

During the blending process ice is added to keep the temperature from going over 30° C. This is important, for if care is not taken to keep the temperature below 30° C. the urea resin will tend to convert to the infusible state. The syrup so prepared is saturated with fillers in accordance with the following formula:

|  | Per cent |
|---|---|
| Resin, 300 parts by weight | 60 |
| TiO2, 50 parts by weight | 10 |
| Alpha cellulose, 150 parts by weight | 30 |
| Chrome yellow, 0.25 parts by weight | 0.05 of total |
| Raw sienna, 0.25 parts by weight | 0.05 of total |

The compound is mixed thoroughly and dried in thin layers at 60° C. to a water content of 5 to 7%. It is then ground, sieved and molded.

It is to be understood that the alkyd resin employed in the foregoing example is merely illustrative of any alkyd resin which could be used. For example, alkyd resins of the fatty acid and oil modified type or alkyd resins of the flexible type may be put into aqueous solution and compounded with the urea resin solution as set forth above. More specifically it may be stated that modified alkyd resins such as described in Kienle Patent 1,893,873, Kienle and Rohlfs 1,897,260 and Durant and Scrutchfield Patent 1,975,569, may be compounded with urea-formaldehyde resins produced as above described, thereby to form new and useful resinous products.

Any of the foregoing resins in aqueous solution may, instead of being used to saturate fillers as described, be used to impregnate and coat laminated stock; for example, sheets of paper or other fibrous material, such as cloth, in thicknesses of say 5 to 50 mils may be saturated with the aqueous resin syrup, dried and molded under heat and pressure. Such articles as refrigerator cabinet panels, refrigerator door strips and loud speaker cones may be successfully made in this manner. Moreover, because of the unusual properties of the urea-formaldehyde resin made in accordance with our invention it has been possible to make loud speaker cones from fabric saturated with the resin and molded, which cones are of a very high degree of stiffness and low density—two very important and desired properties in such an article.

Molding pressure of about 3000 pounds per square inch at a temperature of about 135° C. may be used with the molding compounds prepared as above outlined, the molding time being about 4 to 6 minutes depending on the size, thickness, etc., of the piece being molded. At a higher temperature, say 150° C., the time is shorter, about 1 to 2 minutes. Best results are obtained, however, at the lower temperature. In the case of laminated stock the molding cycle is about 10 to 30 minutes at 135° C. depending upon the thickness of the sheets. The thicker sheets should be molded at a lower temperature, say 125° C., for the longer period to avoid over-cure on the outer laminae. By the addition of suitable dyes and pigments various colors can be obtained in the finished pieces.

Resins produced as described under the foregoing examples also may be used in making improved varnishes or lacquers. The resin syrup is dehydrated, preferably under vacuum, to remove all or nearly all the water, for example, to a water content of 5 per cent or less. The dehydrated resin is dissolved in a suitable volatile solvent such, for instance, as the monomethyl, monoethyl, or the monobutyl ethers of ethylene glycol or of diethylene glycol, or mixtures thereof; methyl, ethyl or butyl acetates or mixtures thereof; butanol; and so on. A particularly suitable solvent comprises a mixture of methyl acetate, butyl acetate, pentacetate, butanol, toluol and xylol. The liquid coating composition may contain, for instance, 25 to 50% resin and 75 to 50% solvent.

What we claim as new and desire to secure by Letters Patent of the United States is:

In a method of making a heat-convertible moldable composition, the steps of effecting reaction between urea and formaldehyde in aqueous solution in the ratio of 1 mol urea to 1 to 1.5 mols formaldehyde, said reaction being carried out at a temperature not exceeding 30° C. and while maintaining the pH of the solution at 7.0 until the resin is formed in solution, adding to the resulting resinous solution an aqueous ammoniacal solution of a soluble glyceryl phthalate resin in an amount by weight corresponding to 60 parts of the said glyceryl phthalate resin to 240 parts of urea-formaldehyde resin and preventing the temperature from rising above 30° C. during the addition of the said glyceryl phthalate resin to the solution of urea-formaldehyde resin, the said glyceryl phthalate resin accelerating the conversion of the said urea-formaldehyde resin to an infusible state during molding of a moldable composition containing the same.

ROY H. KIENLE.
WILLIAM J. SCHEIBER.